US007752698B2

(12) United States Patent
Morin

(10) Patent No.: US 7,752,698 B2
(45) Date of Patent: Jul. 13, 2010

(54) CARWASH BRUSH EXTENSION ARM WITH ROLLER BEARINGS

(75) Inventor: Mark D. Morin, Plymouth, MI (US)

(73) Assignee: Belanger, Inc., Northville, MI (US)

( * ) Notice: Subject to any disclaimer, the term of this patent is extended or adjusted under 35 U.S.C. 154(b) by 1073 days.

(21) Appl. No.: 11/374,915

(22) Filed: Mar. 14, 2006

(65) Prior Publication Data

US 2007/0214588 A1    Sep. 20, 2007

(51) Int. Cl.
*B60S 3/00* (2006.01)
(52) U.S. Cl. .................. 15/53.1; 15/53.2; 15/97.3
(58) Field of Classification Search ......... 15/53.1–53.3, 15/97.3, DIG. 2; 384/15, 25, 36, 45–46, 384/50, 55, 58
See application file for complete search history.

(56) References Cited

U.S. PATENT DOCUMENTS

| 3,633,231 | A | * | 1/1972 | Capra ............................ 34/666 |
| 5,018,878 | A | | 5/1991 | Tsukada et al. |
| 5,195,391 | A | | 3/1993 | Barbat et al. |
| 5,547,285 | A | | 8/1996 | Hutzel et al. |
| 5,551,271 | A | | 9/1996 | Gray et al. |
| 5,715,558 | A | * | 2/1998 | Johnson ..................... 15/53.3 |
| 5,930,859 | A | | 8/1999 | Ennis |
| 6,505,374 | B1 | * | 1/2003 | Weihrauch .............. 15/230.11 |
| 7,100,621 | B2 | * | 9/2006 | Johnson ..................... 134/123 |
| 7,506,394 | B2 | * | 3/2009 | Prater et al. ................ 15/53.2 |
| 2004/0187743 | A1 | | 9/2004 | Kanehira |

* cited by examiner

*Primary Examiner*—Dung Van Nguyen
(74) *Attorney, Agent, or Firm*—Young Basile Hanlon & MacFarlane, PC

(57) ABSTRACT

A carwash brush support structure is extendable relative to a vertical support beam. Extension of the carwash brush carriage is facilitated by means of roller bearings each of which is made up of a U-bolt having threaded ends and a plurality of loosely packed rollers on the U-bolt which engage and roll relative to the surface of a cylindrical rail. The rollers may be of substantially the same size or may be graduated in size toward the opposite ends of the U-bolt to trap the bearing on a cylindrical beam. Rollers of a distinctive color may be located on U-bolt where the greatest roller loading is expected.

15 Claims, 5 Drawing Sheets

US 7,752,698 B2

CARWASH BRUSH EXTENSION ARM WITH ROLLER BEARINGS

FIELD OF THE INVENTION

This invention relates to carwash apparatus and more particularly to an improved roller bearing for use in carwash structures.

BACKGROUND OF THE INVENTION

A support structure for a vertical-axis, rotatable carwash brush is described in the pending application for U.S. Ser. No. 11/096,574, "Wrap Around Brush System for Conveyor Carwash" filed Apr. 1, 2005 and assigned to Belanger, Inc. of Northville, Mich. That application discloses a brush support carriage mounted on an extension arm including two parallel stainless steel beams. The brush support carriage includes Nylon bearings which slide on the two beams and is moved along the beams by an hydraulic power cylinder. The entire extension arm is pivotally mounted on a vertical support structure in a carwash bay.

SUMMARY OF THE INVENTION

The present invention is a roller bearing for use in carwash structures of the type having a carriage or shuttle which requires reliable, low-resistance movement relative to a support structure. An example is the vertical brush extension as disclosed in the pending application for U.S. patent Ser. No. 11/096,574 identified above. The bearing of the present invention generally comprises a U-shaped bolt which receives a loosely-packed plurality of rollers thereon. The bolt preferably has threaded ends to allow it to be attached to a related structure such as a carriage plate. In the installed condition the U-bolt wraps around a cylindrical beam with a smooth exterior surface such that the rollers contact that surface.

In one illustrated embodiment, the rollers are plastic and are all the same size. In another embodiment, certain of the rollers are of gradually increased diameter and have tapered contact surfaces. In all embodiments the rollers have radiused edges.

In one application, the bearing of the present invention is used in multiples and in combination with a pair of parallel, spaced-apart, cylindrical steel arms which support a vertical carwash brush carriage. The bearings are looped over the arms and bolted to a carriage plate to allow the carriage to move along the arms under the control of an hydraulic cylinder.

In accordance with another aspect of the invention, a method of assembling a roller bearing is provided. This method includes the steps of packing a set of distinctively colored rollers on a U-bolt in a location expected to experience the highest loading, and finishing the bearing by adding rollers of another color in the remaining areas of the U-bolt. In this way, the rollers which wear the fastest and require more frequent replacement are easily identified.

The bearings of the present invention may be used in various other applications. For example, they may be used to provide sliding support for a spray arm of the type disclosed in U.S. Pat. No. 6,372,053 assigned to Belanger, Inc.

Various additional features and advantages of the present invention will be apparent from a reading of the following specification which describes illustrative embodiments of the invention in detail.

BRIEF DESCRIPTION OF THE DRAWINGS

Referring now to FIGS. 1-3, there is shown a carwash brush support structure 10 comprising a vertical support beam 12 mounted on a bolt down floor plate 14. The vertical support structure 12 carries a horizontal brush support arm 16 which can be pivoted about a vertical axis by control structure 18, the details of which are fully described in the aforesaid pending U.S. patent application Ser. No. 11/096,574, the entire disclosure of which is incorporated herein by reference. The extendable support arm structure 16 comprises parallel cylindrical stainless steel arms 20 and 22, and a brush carriage 24, the longitudinal position of which along the support arms 20 and 22 is controlled by an hydraulic cylinder 28 having a connector rod 26 between the cylindrical support arms 20 and 22 and the carriage 24.

Figure 1:
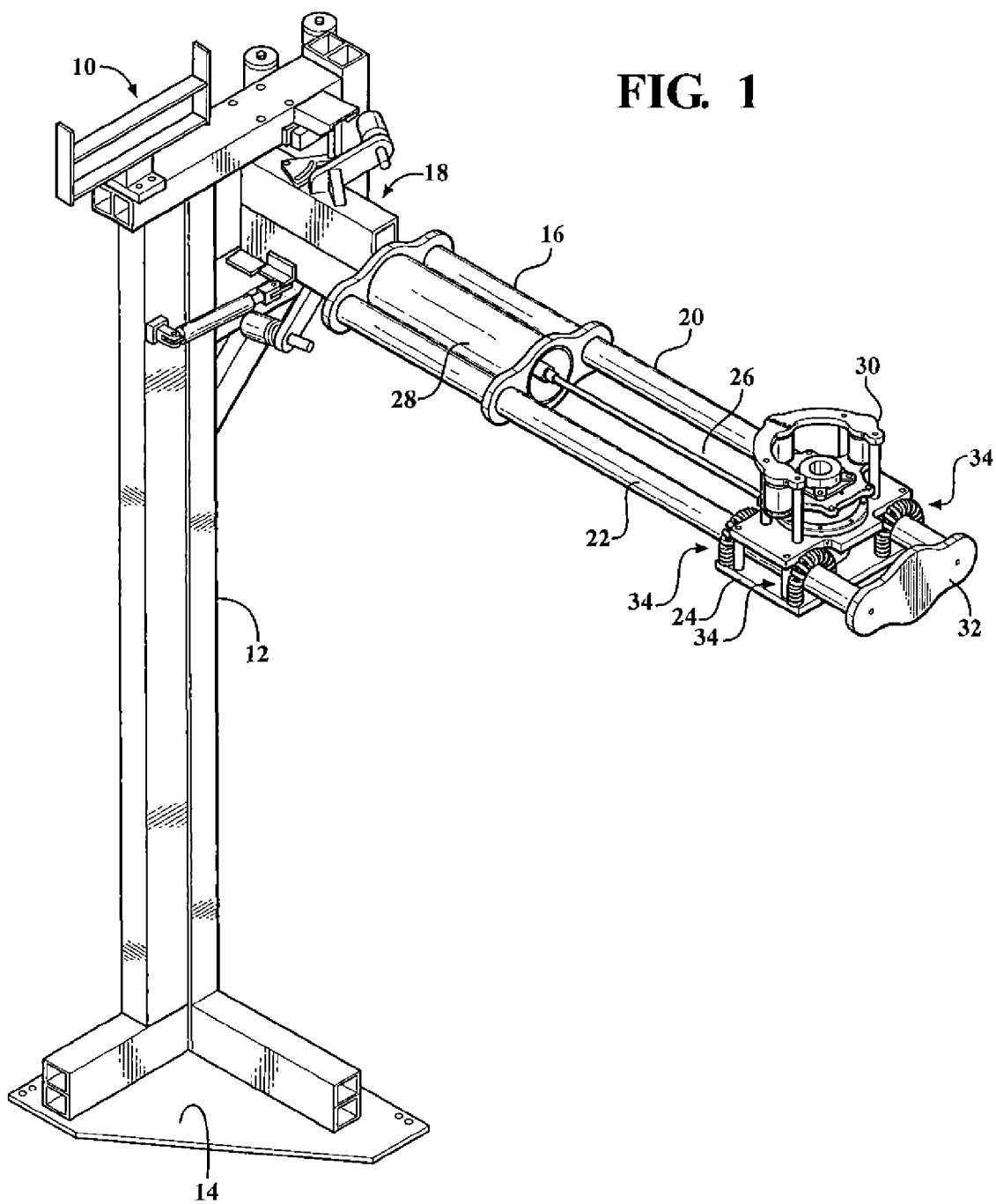
FIG. 1 is a perspective view of a carwash brush support structure generally of the type described in greater detail in the aforesaid pending application for U.S. patent Ser. No. 11/096,574, but with the improved bearing structure of the present invention.
Figure 2:
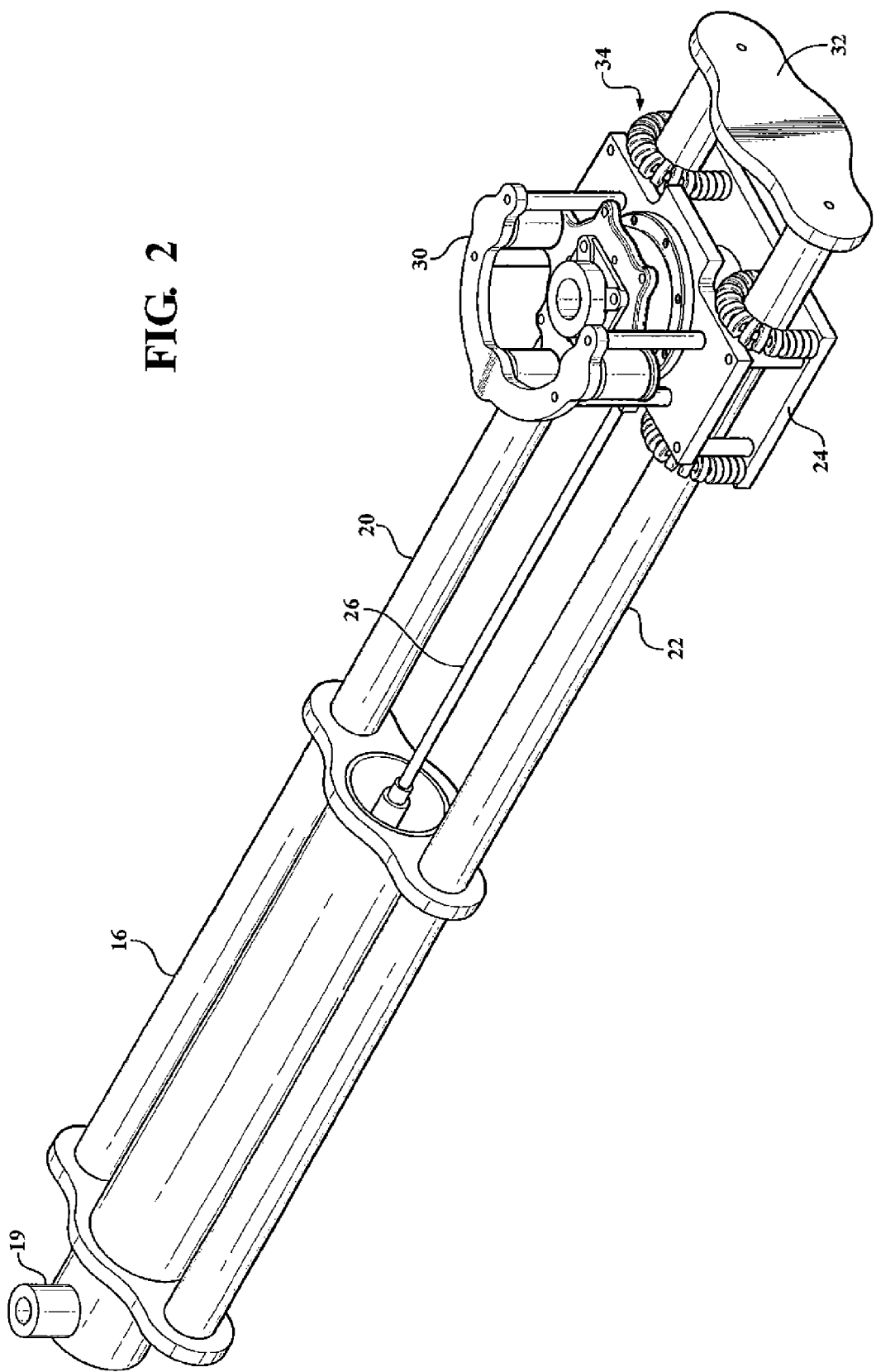
FIG. 2 is a perspective view of a portion of the structure of FIG. 1 showing the horizontal support arm and the bearing structures on that arm to permit movement of a brush carriage along the support arm.
Figure 3:
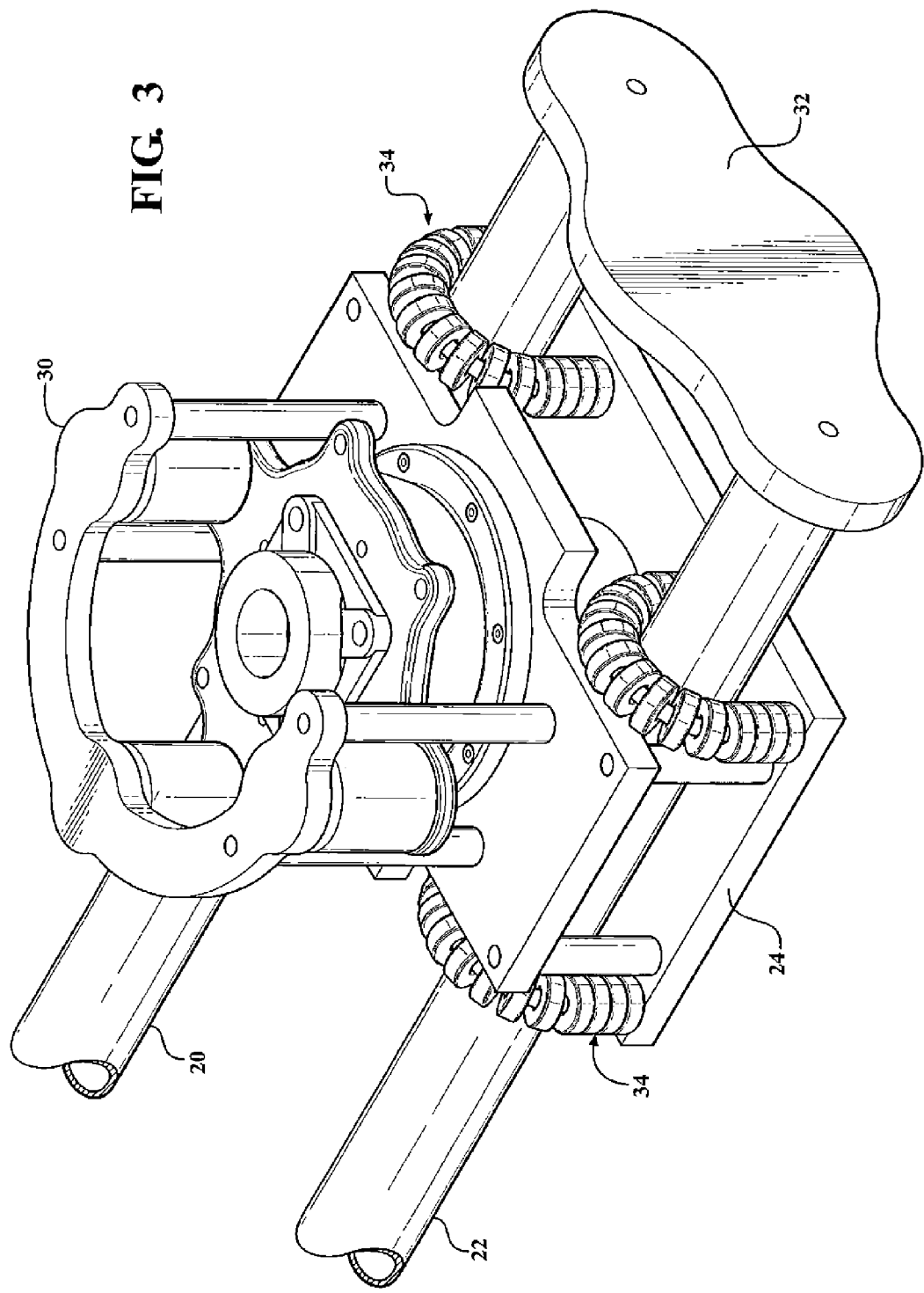
FIG. 3 is an enlarged view of the carriage and bearing assembly of FIGS. 1 and 2.

The carriage 24 supports a brush motor frame 30 and various additional structural details to receive a carwash brush drive shaft as will be apparent from a reading of the aforesaid pending U.S. patent application.

Four roller bearings 34 are mounted for rolling contact on the cylindrical support beams 20 and 22 and are connected by means hereinafter described to the lower plate of the carriage 24 as shown. A stop plate 32 prevents the carriage from running off the ends of the beans 20 and 22.

Figure 4:
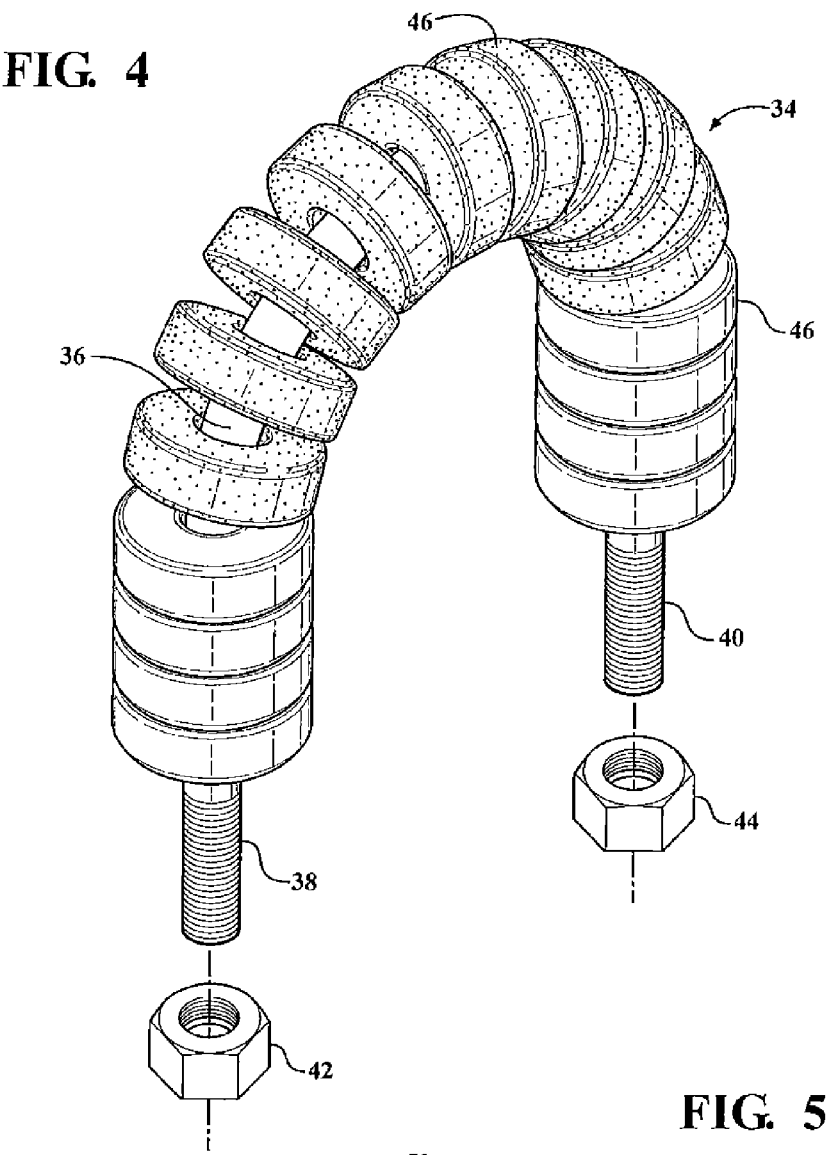
FIG. 4 is a perspective view of a bearing constructed in accordance with the present invention.
Figure 5:
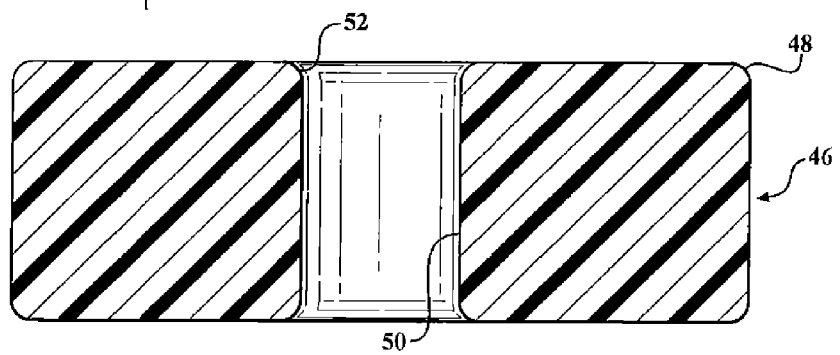
FIG. 5 is a cross-sectional view of one of the rollers in the bearing of FIG. 4.

Referring now to FIGS. 4 and 5, each bearing 34 is shown to comprise a steel U-bolt 36 having opposite threaded ends 38 and 40. The distance between the center lines of the threaded ends 38 and 40 is approximately 4½ inches in a typical carwash application and the diameter of the U-bolt itself is approximately ½ inch. The threaded ends receive conventional nuts 42 and 44 as well as a plurality of loosely packed rollers 46 which in the embodiment described herein are approximately 1½ inches in diameter and have a center hole 50 with a diameter of slightly more than ½ inch; i.e., large enough to easily slide onto the U-bolt 36 and to permit some freedom or "play" relative thereto so as to accommodate the curve of the U-bolt 36 without binding. The rollers 46 have radiused exterior edges 48 as well as radiused interior edges 52 and are preferably made of an elastomeric material such as an acetyl copolymer or HDPE but could also be made of a high modulus of elasticity material such as steel. Each roller 46 is approximately ½ inch in width.

In this embodiment the diameter of the cylindrical support beams 20 and 22, also called "rails", is approximately three inches plus or minus 0.006 inches and the materials of construction include polished steel and stainless steel. These specifications and sizes are given by way of example only as they may vary according to the particular application, the weight of the load being supported and so forth. In the embodiment shown there are 18 rollers 46 on the lack of U-bolts 36. Also it will be apparent that in this particular application the support beams 20 and 22 could be semi-cylindrical since only approximately the upper 180 degrees of exterior surface carry the load of the carriage 24 and the brush which is carried by it. A cylindrical structure is, however, preferred not only because of the greater availability of tubular stock, but also the fact that a vertical brush in a carwash system tends to experience side loads and the bearings may, because of this, wrap around the support beams 20 and 22 so as to impose loads on up to 300 degrees of exterior surface.

Figure 6:
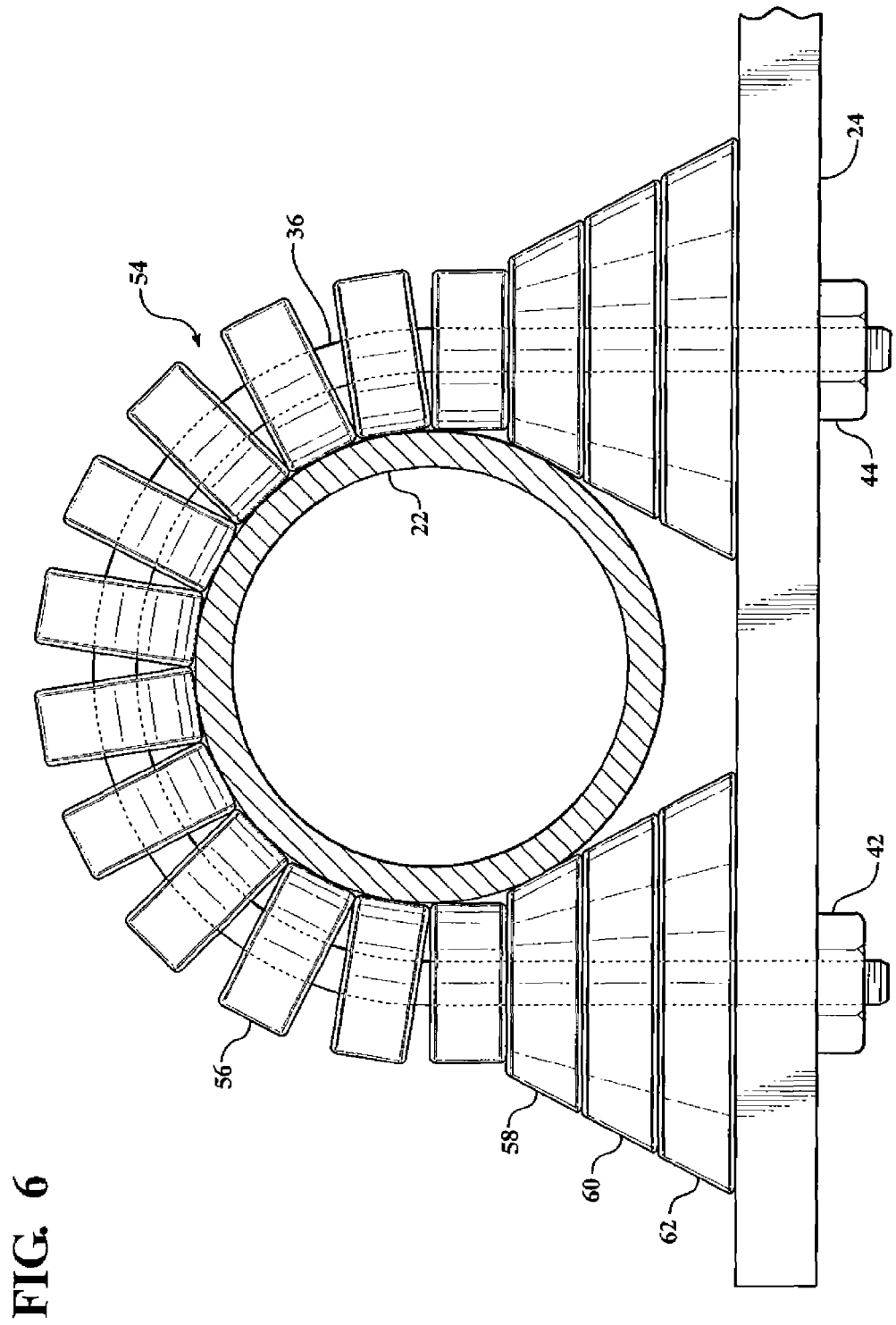
FIG. 6 is an end-view of a second illustrative embodiment of the bearing of the present invention.

Looking now to FIG. 6 an alternative embodiment of the invention is illustrated in a roller bearing structure 54 used to support a load in the form of the carwash carriage support plate 24 on a cylindrical or tubular beam 22. The bearing 54 comprises a U-bolt 36 and threaded nuts 42 and 44 exactly as described with reference to FIG. 4. However, in the embodiment of FIG. 6 only 12 of the rollers 56 are of uniform size. The additional roller pairs 58, 60 and 62 are all of gradually increasing size and have tapered exterior bearing surfaces so as to trap the bearing structure on the cylindrical beam 22. This arrangement is particularly useful where the supported structure 24 may impose not only vertically downwardly oriented loads, but side loads and upwardly directed loads as well and it is desirable to prevent lifting of the bearing structure and the support plate 24 relative to the centerline of the rail 22. Again, the rollers are preferably made of an elastomeric material and have radiused interior and exterior edges.

The rollers 46 and 56 of the two illustrated embodiments may also be color coded according to expected life; i.e., the top four or six rollers 46 or 56 which bear the greatest load and wear the fastest may be colored red while side rollers are colored green. This helps to show maintenance personnel that the red colored rollers are to be changed more often to maintain the integrity and efficiency of the system.

It will be apparent to those skilled in the art that the bearing structure shown in this application can be used in a variety of applications and orientations. For example, the bearing may be used to advantage in supporting a shuttle-type carriage which moves laterally to provide expanded range and higher efficiency in a spray-type carwash system such as that described in U.S. Pat. No. 6,372,053. In addition, the bearing structures can be mounted in such a way as to be of varying orientation; i.e., one U-bolt may be mounted with the parallel legs or ends in a downward facing orientation while another may be mounted with the legs in an upward opening orientation to prevent levering of the supported load. These examples are given by way of illustration to show the flexibility and near universal applicability of the bearing structure of the present invention.

What is claimed is:

1. A carwash structure comprising:
   a carwash implement support arm having a curved bearing surface;
   a carwash implement support carriage; and
   a bearing fixed to said carriage and contacting said bearing surface, said bearing including a U-shaped bolt and a plurality of rollers rotatably mounted on said bolt in loosely packed relationship.

2. A carwash structure as defined in claim 1 wherein all of the rollers are substantially the same size.

3. A carwash structure as defined in claim 1 wherein the rollers are made of a solid elastomeric material.

4. A carwash structure as defined in claim 1 wherein the rollers have radiused edges.

5. A carwash structure as defined in claim 1 wherein the rollers have a diameter on the order of 1-2 inches.

6. A carwash structure as defined in claim 1 wherein the carriage is adapted to receive a rotatable carwash brush.

7. A carwash structure comprising:
   a pair of parallel cylindrical support arms having smooth exterior surfaces;
   a carwash implement support carriage; and
   a pair of bearings connecting said carriage to said parallel support arms, each bearing including a U-shaped bolt with threaded ends and a plurality of rollers rotatably mounted on said bolt in loosely packed relationship.

8. A carwash structure as defined in claim 7, wherein all the rollers are of substantially the same size.

9. The carwash structure of claim 7, wherein the rollers are made of an elastomeric material and have radiused inside and outside edges.

10. A roller bearing comprising:
    a support member of solid, rigid material having a substantially fixed U-shape and circular cross-section; and
    a plurality of solid bearing rollers mounted on the support member in loosely packed relationship.

11. A bearing as described in claim 10 wherein the rollers are all substantially the same size.

12. A bearing as described in claim 10 wherein the rollers are made of an elastomeric material.

13. A bearing as described in claim 10 wherein the support member is a U-bolt with threaded ends.

14. A bearing as described in claim 10 wherein a first group of adjacent rollers in the center of the plurality are of substantially the same size, but the rollers toward the ends of the support structure are of gradually increasing size and have tapered contact surfaces so as to engage and trap the support member on a cylindrical structure.

15. A bearing as described in claim 10 wherein the rollers which carry the greatest load are of a color which is different from the remainder of the rollers.

\* \* \* \* \*